United States Patent [19]

Folts

[11] Patent Number: 5,302,858
[45] Date of Patent: Apr. 12, 1994

[54] METHOD AND APPARATUS FOR PROVIDING BATTERY CHARGING IN A BACKUP POWER SYSTEM

[75] Inventor: Douglas C. Folts, Mauston, Wis.

[73] Assignee: Best Power Technology, Incorporated, Necedah, Wis.

[21] Appl. No.: 805,496

[22] Filed: Dec. 11, 1991

[51] Int. Cl.⁵ .................... H02J 9/06; H02J 7/04
[52] U.S. Cl. ...................... 307/66; 307/100; 320/21; 363/132
[58] Field of Search ............. 307/48, 66, 100, 104, 307/106; 320/14, 21; 363/132, 126, 127

[56] References Cited

U.S. PATENT DOCUMENTS

| | | | |
|---|---|---|---|
| 4,277,692 | 7/1981 | Small | 307/66 |
| 4,366,389 | 12/1982 | Hussey | 307/66 |
| 4,400,624 | 8/1983 | Ebert, Jr. | 307/43 |
| 4,400,625 | 8/1983 | Hussey | 307/66 |
| 4,475,047 | 10/1984 | Ebert, Jr. | 307/66 |
| 4,604,530 | 8/1986 | Shibuya | 307/66 |
| 4,616,305 | 10/1986 | Damiano et al. | 363/132 |
| 4,673,825 | 6/1987 | Raddi et al. | 307/66 |
| 4,740,739 | 4/1988 | Quammen et al. | 320/21 X |
| 4,829,225 | 5/1989 | Podrazhansky et al. | 320/14 |
| 4,882,717 | 11/1989 | Hayakawa et al. | 320/21 X |
| 4,920,475 | 4/1990 | Rippel | 363/132 |
| 5,221,862 | 6/1993 | Fiorina et al. | 307/66 |

FOREIGN PATENT DOCUMENTS

2602789 7/1977 Fed. Rep. of Germany ........ 320/21

Primary Examiner—Jeffrey A. Gaffin
Assistant Examiner—F. M. Fleming
Attorney, Agent, or Firm—Foley & Lardner

[57] ABSTRACT

A battery in a back-up power system is charged during the time that power is available from the main AC power system by utilizing the main power transformer and the main inverter. When power is available from the main AC power source, an AC voltage appears across the primary of the transformer, which is connected to the inverter. Switches in the bridge inverter are turned on for a relatively brief period of time to short the primary of the transformer causing current through the leakage inductances of the transformer to rapidly build up. When the switching devices are turned off, the inductances induce a current to continue to flow from the primary into the inverter through anti-parallel diodes, normally back biased by the voltage from the battery, into the battery thereby charging the battery with the energy stored in the transformer inductances. The inverter current reaches zero when the energy stored in the inductance is fully discharged. The cycle may be repeated by turning on the switching devices in the inverter bridge at periodic points in time, allowing the current in the inverter to dwell periodically at zero, or by immediately turning on the switching devices again when the current into the inverter reaches zero.

22 Claims, 11 Drawing Sheets

FIG. 12
FULL RESISTIVE DISCHARGE

FIG. 13

METHOD AND APPARATUS FOR PROVIDING BATTERY CHARGING IN A BACKUP POWER SYSTEM

FIELD OF THE INVENTION

This invention pertains generally to the field of auxiliary power systems which provide backup power from a battery to a critical load when the main power system fails and particularly to the charging of the battery in such systems.

BACKGROUND OF THE INVENTION

A standby or uninterruptible power supply, referred to herein generally as backup power systems, provide output power to a load when the main input power, usually from commercial power lines, fails. Typical backup power systems have an inverter to convert the DC voltage provided from a storage battery to the required AC output voltage. A static switch or relay may be utilized to isolate the AC output voltage from the failed input power. A common prior art arrangement for a backup power system is illustrated in the simplified schematic of FIG. 1. AC input power from a main source, such as a commercial power system, is received on input lines 10 and 11, and output power is delivered on output lines 12 and 13 to the critical load (not shown). A static switch 14 is connected in a line 15 between the input line 10 and the output line 12 to isolate the input from the output upon failure of the main AC power system, while a line 16 directly connects the input line 11 and the output line 13. Upon failure of the main AC power, a controller (not shown) detects the failure of the AC line power, opens the static switch 14, and turns on an inverter 17 to convert DC voltage, from a storage battery 18, to AC voltage at the inverter output terminals which is provided through a power transformer 19 across the AC output lines 12 and 13. During normal operation when the inverter 17 is off, a battery charger 21 provides DC charging current to the battery 18 by rectifying AC power from a charger transformer 23 which is connected by lines 24 and 25 to the AC power lines. The charger transformer 23 and the power transformer 19 serve in large part to isolate the typically low voltage DC circuits of the battery charger and inverter from the high voltage AC line circuits.

Figure 1:
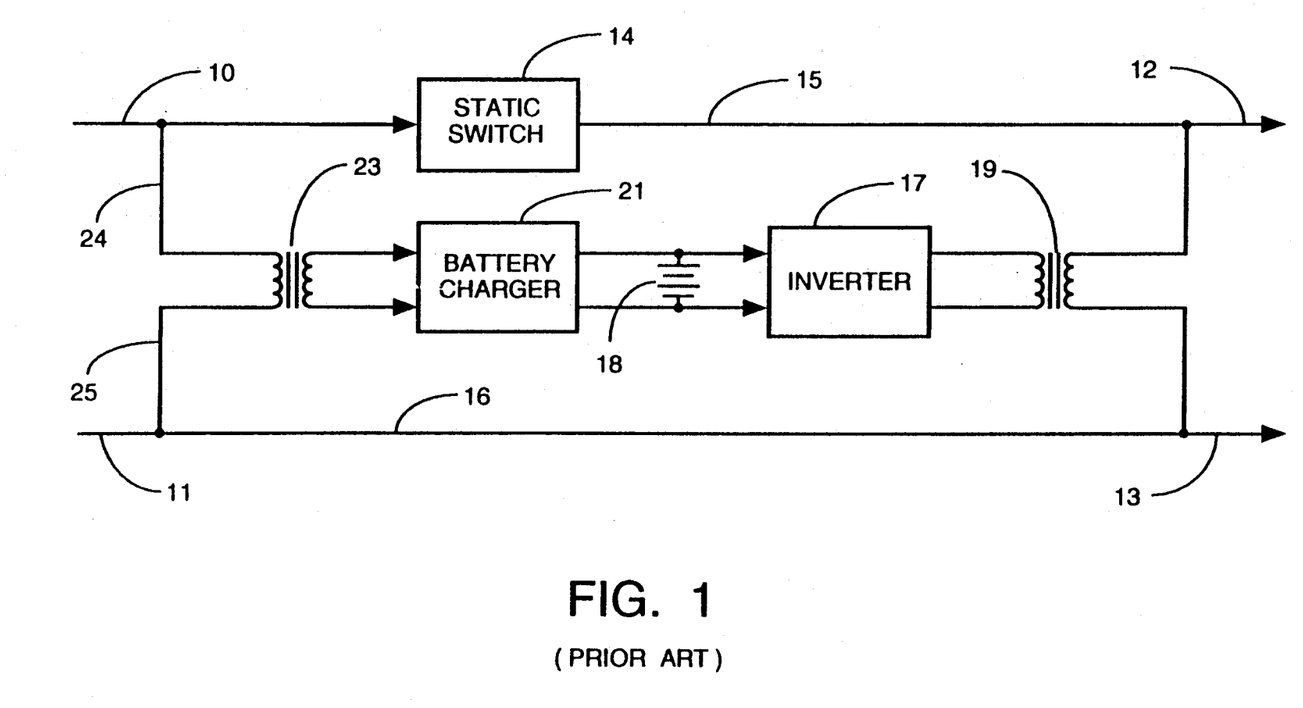
FIG. 1 is a schematic block diagram of a backup power system in accordance with the prior art.

A problem commonly associated with a backup power system of the type shown in FIG. 1 is that while the AC input voltage is present, the inverter 17 is turned off. It is desirable to have a way of testing the inverter to verify that the inverter is in good operating condition, since the reliability of the inverter is crucial to the backup power system's mission. In the prior art, such inverter testing requires additional circuitry and controls, and thus added expense.

The battery chargers used in various backup power systems vary widely in circuit topology, but have common problems. The most significant problem arises from the rectifier/capacitor filter combination typically used to convert the AC voltage from the charger transformer to the DC voltage required by the battery, because current is drawn in bursts or pulses at the crest of the input voltage waveform. This causes harmonic distortion of the AC input current. Phase-controlled battery chargers cause even worse distortions. While solutions exist to solve this problem, such solutions typically require additional circuitry and thus expense. The charger circuitry also adds expense to such backup power systems, with the cost of the chargers being generally proportional to charging current levels.

SUMMARY OF THE INVENTION

The present invention eliminates the need for the separate charger transformer and battery charger conventionally used in backup power systems by utilizing the main inverter to do the battery charging. Eliminating the separate charger lowers costs, reduces complexity and the weight of the system, and improves system reliability. The invention provides inherent power factor correction because, without the need for any additional control circuitry, the inverter-charger draws a sinusoidal (nondistorted) current from the power lines. Moreover, because the inverter is operated during the time that normal AC input power is provided to the load, a means for inverter testing is available. In addition, the battery can be tested by properly controlling the operation of the inverter during normal conditions on the AC power lines. An additional benefit of utilizing the inverter to charge the battery is that a higher conversion efficiency is obtained than is usually available from a normal battery charger, since the inverter is usually significantly oversized compared to what is required for battery charging.

The present invention utilizes the primary and secondary leakage reactances of the main power transformer in cooperation with the switching devices of an H-bridge inverter. The battery voltage and the power transformer turns ratio are selected so that the voltage across the power lines, reflected to the primary of the transformer, will have a peak which is less than the battery voltage. Consequently, the battery will back-bias diodes (e.g., the intrinsic anti-parallel diodes) connected across each of the switching devices in the inverter bridge. These switching devices are then controlled to provide a cycle having an energy build-up state and a discharge state. In a first or energy buildup state, at least one and preferably two of the devices in the bridge short the primary, causing current to flow through the inverter in a loop and through the transformer primary and secondary leakage inductances to build up a current flowing through these inductances. The switching devices in the inverter are then switched off to result in a second or discharge state in which the current flowing in the leakage inductances flows through forwardly biased anti-parallel diodes around the switching devices and provide charging current to the battery. When the energy stored in the inductances is fully discharged (by being substantially transferred to the battery), the battery voltage again back biases the diodes of the switching devices so that no further current flows to the battery. The energy build-up state is similar for positive and negative half cycles of the input AC power waveform, except that current flows in opposite directions in the transformer leakage inductances. When the switching devices are then turned off, the current in the inductances flows through the appropriate antiparallel diodes in opposite legs of the bridge to charge the battery. After the energy in the inductances is transferred to the battery, the battery voltage again back biases all of the diodes so that no further current flows.

The inverter may be operated in either a constant frequency inverter charge mode or a variable frequency mode, the latter yielding a higher charge current. In the constant frequency mode, a wait state occurs between the energy discharge and build-up states since the states are initiated at a constant frequency. In the variable frequency mode, a new energy build-up state can begin as soon as the energy release state is completed and vice versa. Current ramping to zero at the end of the release state is used to signal the controller controlling the inverter switches that the energy buildup state should begin again. Operation in the variable frequency mode thus yields a higher average charge current and is generally preferred.

Further objects, features and advantages of the invention will be apparent from the following detailed description when taken in conjunction with the accompanying drawings.

DETAILED DESCRIPTION OF THE INVENTION

Figure 2:
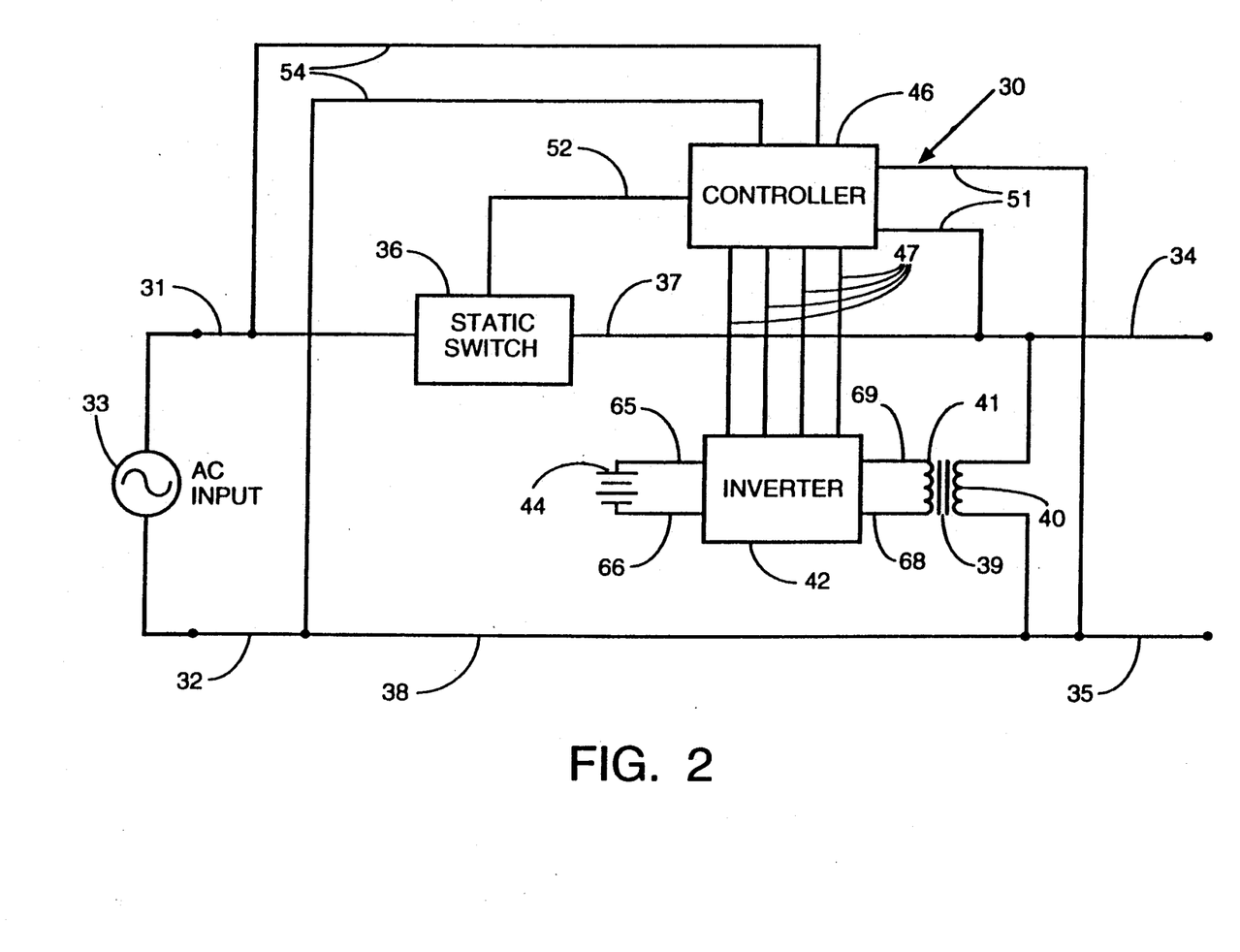
FIG. 2 is a schematic block diagram of a backup power system in accordance with the present invention.

With reference to the drawings, a schematic block diagram of a backup power system incorporating battery charging in accordance with the present invention is shown generally at 30 in FIG. 2. The backup power system 30 receives AC input power at input terminals 31 and 32 from the main AC power source 33, e.g., a commercial power grid, and delivers AC output power at output terminals 34 and 35 to a critical load (not shown), for example, a computer. A static switch 36 is connected in an input power path line 37 which connects the input terminal 31 to the output terminal 34, while a line 38 directly connects the input terminal 32 to the output terminal 35. A main power transformer 39 has its secondary 40 connected between the power lines 37 and 38 and its primary 41 connected to an inverter 42. The inverter 42 receives DC voltage from a battery 44 and, under the control of a controller 46, delivers AC output power to the primary 41 of the transformer 39 to provide higher voltage AC power from the secondary 40 to the output terminals 34 and 35. The controller 46 provides control signals on control lines 47 to the inverter, and may receive lines 51 connected to provide the controller with the output voltage across the output terminals 34 and 35 and lines 54 connected to provide the controller with the voltage across the input lines 31 and 32. The controller also provides a control signal on a line 52 to the static switch 36 to open and close the switch as appropriate. The inverter 42 may be of various standard bridge designs, as described further below, and the controller 46 and the static switch 36 may be of standard construction with many types well known in the art of standby and uninterruptible power systems. An example of a back-up uninterruptible power system in which the present invention may be incorporated is shown in U.S. patent application Ser. No. 07/702,733, filed May 17, 1991, which is incorporated herein by reference.

In operation, when adequate AC power is available on the input terminals 31 and 32 from the source 33, the static switch 36 is closed and the AC input power from the terminals 31 and 32 is directly connected to the output terminals 34 and 35. The controller 46 monitors the input voltage across the lines 31 and 32 and receives this voltage on input lines 54. Upon determining that a failure of line power has occurred at the input terminals 31 and 32, which may be determined in any desired way known in the art, the controller 46 provides a control signal on the line 52 to open the static switch 36 to disconnect the terminal 31 from the terminal 34. If desired, an additional relay may be incorporated in the line 37 to fully isolate the terminal 31 from the terminal 34, and mechanical switches or static switches may be incorporated in the line 38 to open that line also. At the time the static switch 36 is opened, the controller provides control signals on lines 47 to the inverter 42 to turn it on to invert the voltage provided from the battery 44 into AC voltage applied to the primary 41 of the transformer 39, thereby providing AC output power at the output terminals 34 and 35 for the duration of the main AC power line failure. When the controller 46 determines that adequate AC line power has been restored to the terminals 31 and 32, the controller turns off the inverter 42 and closes the static switch 36 to again connect the input power from the input terminals 31 and 32 to the output terminals 34 and 35.

The operation of the system as described above is conventional and any of various known designs may be utilized to carry out these functions in a well known fashion. The present invention is directed to the utilization of the power transformer 39, the bridge inverter 42 and the battery 44 under the control of the controller 46 to provide charging of the battery 44, during normal supply of power from the input terminals 31 and 32 to the output terminals 34 and 35, without the need for a separate charging transformer or a separate battery charger.

Figure 3:
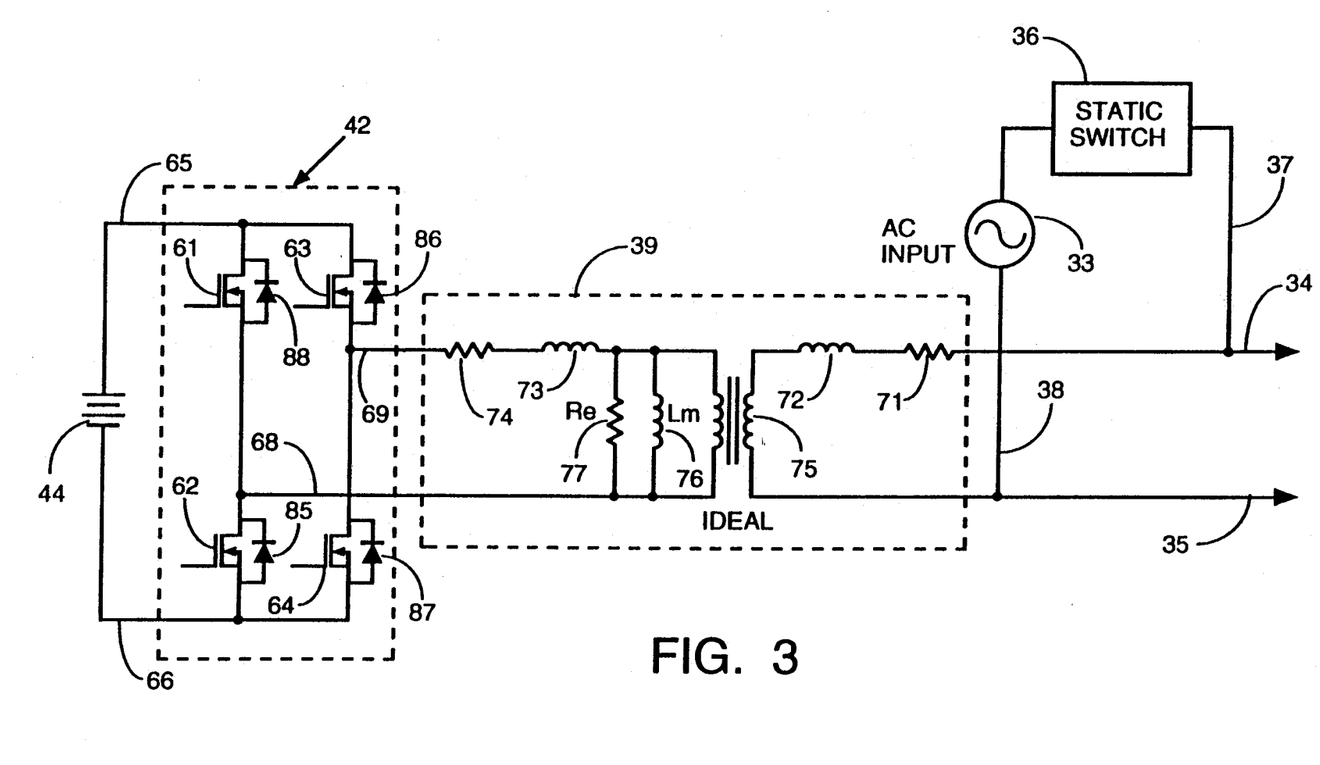
FIG. 3 is a circuit schematic of an equivalent circuit for the backup power system of the present invention.

For purposes of illustrating the invention, a simplified equivalent circuit of the backup power system is shown in FIG. 3. An illustrative inverter 42 includes four switching devices 61, 62, 63 and 64, (e.g., gate controlled power MOSFETs having intrinsic anti-parallel diodes) connected in an H-bridge configuration across input DC power supply lines 65 and 66 connected to the battery 44, and with AC output lines 68 and 69 connected to the primary of the transformer 39. The "T" equivalent circuit of the transformer 39 shown in FIG. 3 includes a secondary resistance 71 and a secondary leakage inductance 72, a primary resistance 74 and a primary leakage inductance 73, an ideal transformer 75 whose turns ratio appropriately steps the low voltage inverter waveform up to the high AC line voltage on the secondary, and a magnetizing inductance 76 and excitation (core) loss resistance 77 effectively connected across the lines 68 and 69. Each of the switching devices 61-64 preferably has an anti-parallel connected diode 85-88, e.g., an intrinsic diode.

Figure 4:
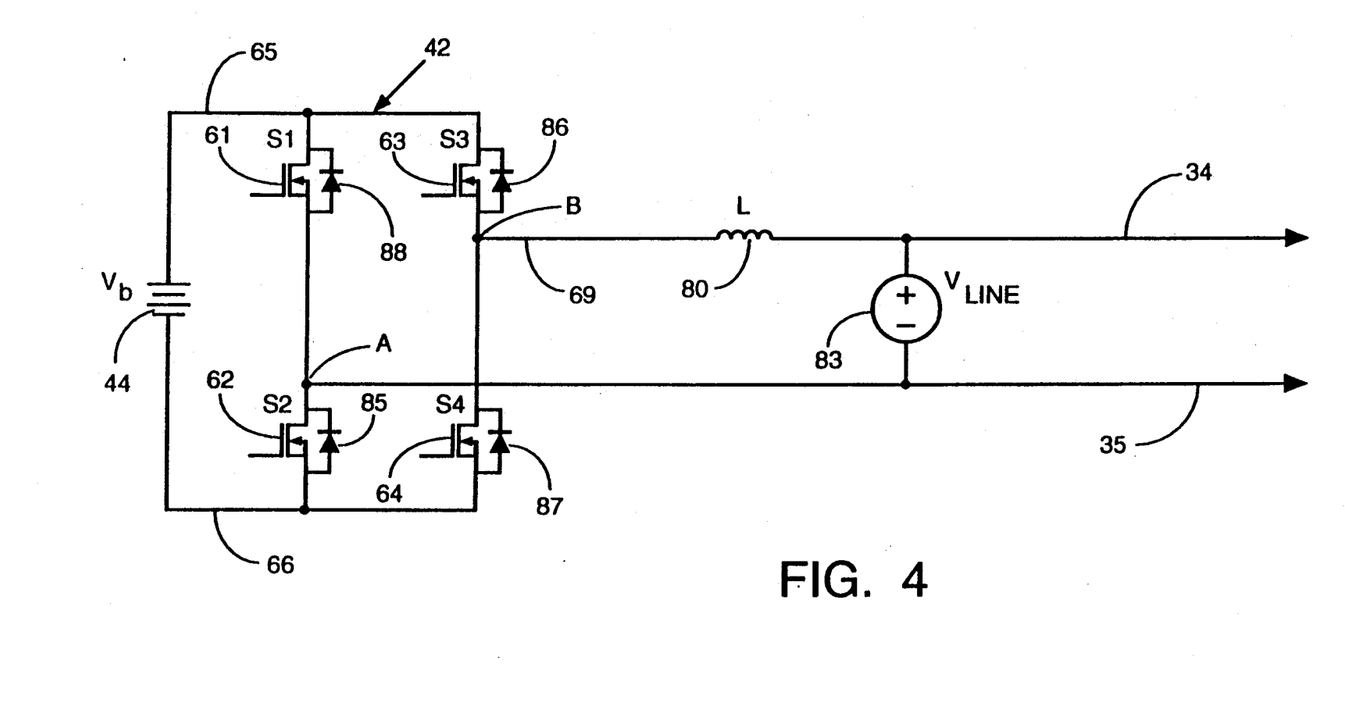
FIG. 4 is a circuit schematic of simplified equivalent circuit for the backup power system of the invention.

The equivalent circuit of FIG. 3 can be simplified even further as shown in FIG. 4, in which the static switch 36 is not shown (since it is assumed that power is being provided directly from the source 33 to the output lines 34 and 35). For purposes of illustrating the present invention, in FIG. 4 the magnetizing inductance 76 and the primary and secondary and excitation loss resistances have been eliminated, and the primary and secondary leakage reactances are lumped together as a series connected single inductance 80 extending from the inverter output connection (B in FIG. 4) to the output line 34. In the simplified circuit of FIG. 4, the AC input voltage from the source 33 and the static switch have been replaced with a voltage source 83 which is shown providing a DC voltage, the magnitude and polarity of which correspond to the instantaneous value of the AC input voltage. For purposes of the explanation of the operation of the circuit as further described below, it will be assumed that the voltage across the lines 34 and 35 provided by the source 83 is constant during a cycle of charging of the battery. This assumption is reasonable because the time duration of interest for a cycle of battery charging is much shorter than the period of the AC line power.

During normal operation, where the AC power source 33 is providing adequate power, 60 Hertz AC voltage is present on the primary of the transformer, and thus appears between the nodes A and B shown in FIG. 4. For proper charging operation in accordance with the present invention, it is desirable that the peak voltage appearing across the nodes A and B be less than the voltage $V_b$ of the battery 44. This can be insured by proper choice of the nominal battery voltage and the turns ratio of the primary and secondary of the transformer 39, given the expected peak value of the voltage from the AC power system 33.

Figure 5:
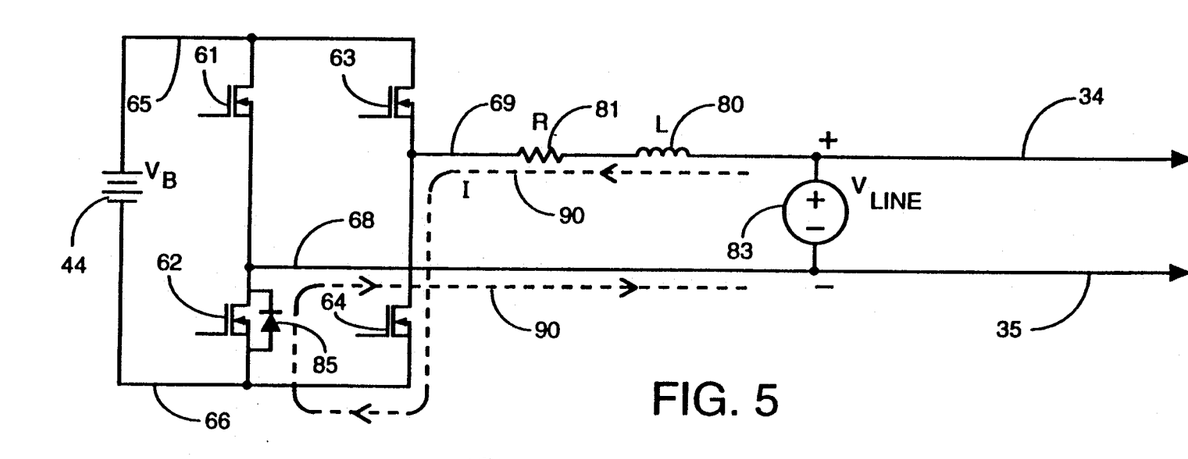
FIG. 5 is a circuit schematic as in FIG. 4 showing the current paths during the energy buildup phase of the positive half cycle.

Battery charging utilizing the inverter 42 in accordance with the present invention is carried out in two or three separate states. In the first state, which may be called the energy build-up state, at least the switch 64 is turned on and preferably both switches 62 and 64 are turned on. This results in a current path illustrated by the dashed lines labeled 90 in FIG. 5 through the switch (e.g., MOSFET) 64 and through the switch 62 or the anti-parallel diode 85 around the switch 62. Where the switches are MOSFETs, it is noted that current will flow in the reverse direction in the channel of the MOSFET 62 until the channel voltage drop exceeds the turn-on threshold of the antiparallel diode, after which current flows in both the MOSFET channel and the intrinsic diode. Turning on the switches 62 and 64 effectively shorts the primary 41 of the transformer, causing the current flowing through the equivalent inductance 80 and an effective equivalent transformer resistor 81 of resistance R to build up rapidly, thus storing energy in the magnetic field of the inductance 80. After a predetermined, fixed period of time, the switches 62 and 64 are turned off by the controller, ending the first state. The magnitude of the current flowing along the path 90 at turn-off is proportional to the instantaneous line voltage across the lines 34 and 35, which changes over time. During the period of time that the switches 62 and 64 had been turned on (e.g., a fraction of a millisecond), the voltage across the lines 34 and 35 provided by the effective voltage source 83 is substantially constant. Thus, at times near the line voltage zero crossing, where the voltage across the lines 34 and 35 is low, the peak current flowing along the path 90 will also be low. Conversely, at the times of the line voltage peaks, the current magnitude will reach its highest value.

Figure 6:
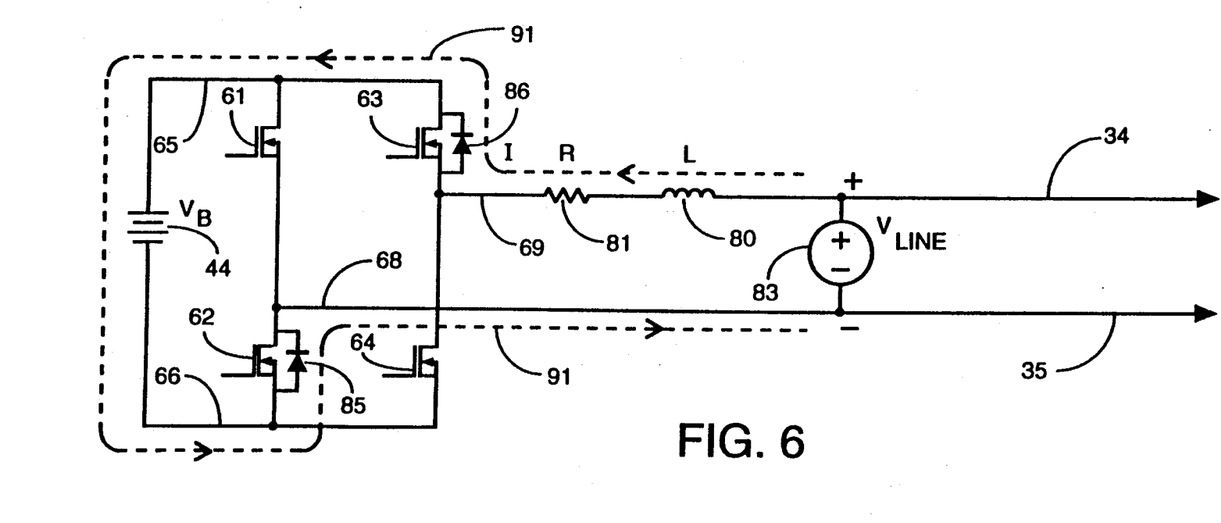
FIG. 6 is a circuit schematic as in FIG. 4 showing the current paths during the energy release state of the positive half cycle.

At the time that the switches 62 and 64 are turned off, the second state, which may be called the energy release state, begins. The energy that was stored in the inductance 80 is now released into the battery 44 as the effective inductance 80 continues to try to maintain the current flowing through it. During the positive half cycles of the voltage input waveform, the current flows on the path 91 shown in FIG. 6 through the intrinsic diodes 85 and 86 connected in anti-parallel with the switching devices 62 and 63, respectively.

Figure 7:
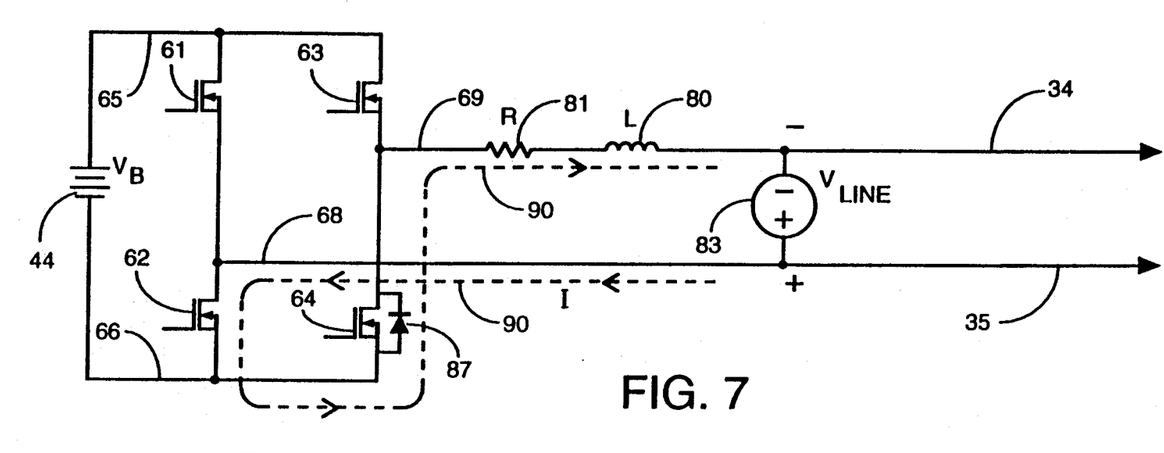
FIG. 7 is a circuit schematic as in FIG. 4 showing the current paths during the energy buildup state of the negative half cycle.
Figure 8:
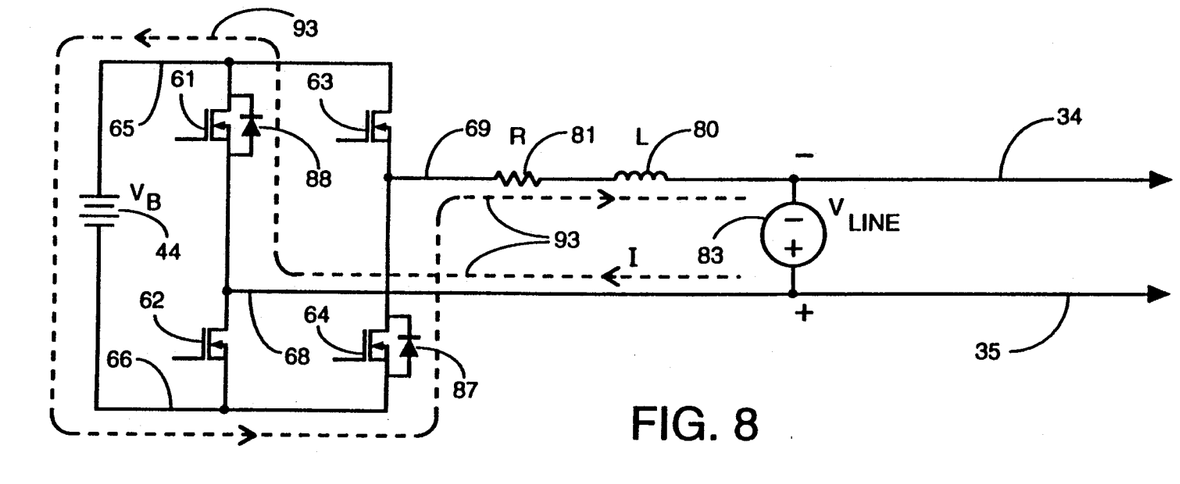
FIG. 8 is a circuit schematic as in FIG. 4 showing the current paths during the energy release state of the negative half cycle.

During negative half cycles of the AC input voltage, current flows in the opposite direction along the current path 90 during the initial energy buildup state when the switches 62 and 64 are turned on, as shown in FIG. 7. When the switches 62 and 64 are turned off, energy release occurs, as shown in FIG. 8, along a path 93 through the intrinsic diodes 87 and 88 connected in anti-parallel with the switching devices 61 and 64. The charging current declines as the energy stored in the inductor is released, and reaches zero when all of the energy in the effective inductance has been transferred to the battery, ending the second state.

The third state is an optional wait state which is utilized only if constant frequency inverter-charger operation is desired. If constant frequency is not a requirement, the third state may be eliminated. Where constant frequency inverter operation is carried out, a repeat of the cycle, e.g., turn-on of the switches 62 and 64, occurs at a predetermined period of time after the previous turn-on of these devices. Thus, the controller for the inverter during charging may consist of a simple oscillator circuit providing turn on and off signals to the gates of the switches 62 and 64 at periodic points in time.

Where constant frequency operation is not required, when the current flowing from the inductance 80 along the line 69 reaches zero, the first state is reinitiated by turning the switches 62 and 64 on. By operating in the variable frequency mode, eliminating the third state, it is possible to obtain a higher average charging current and such operation is thus the preferred implementation of the present invention.

Figure 9:
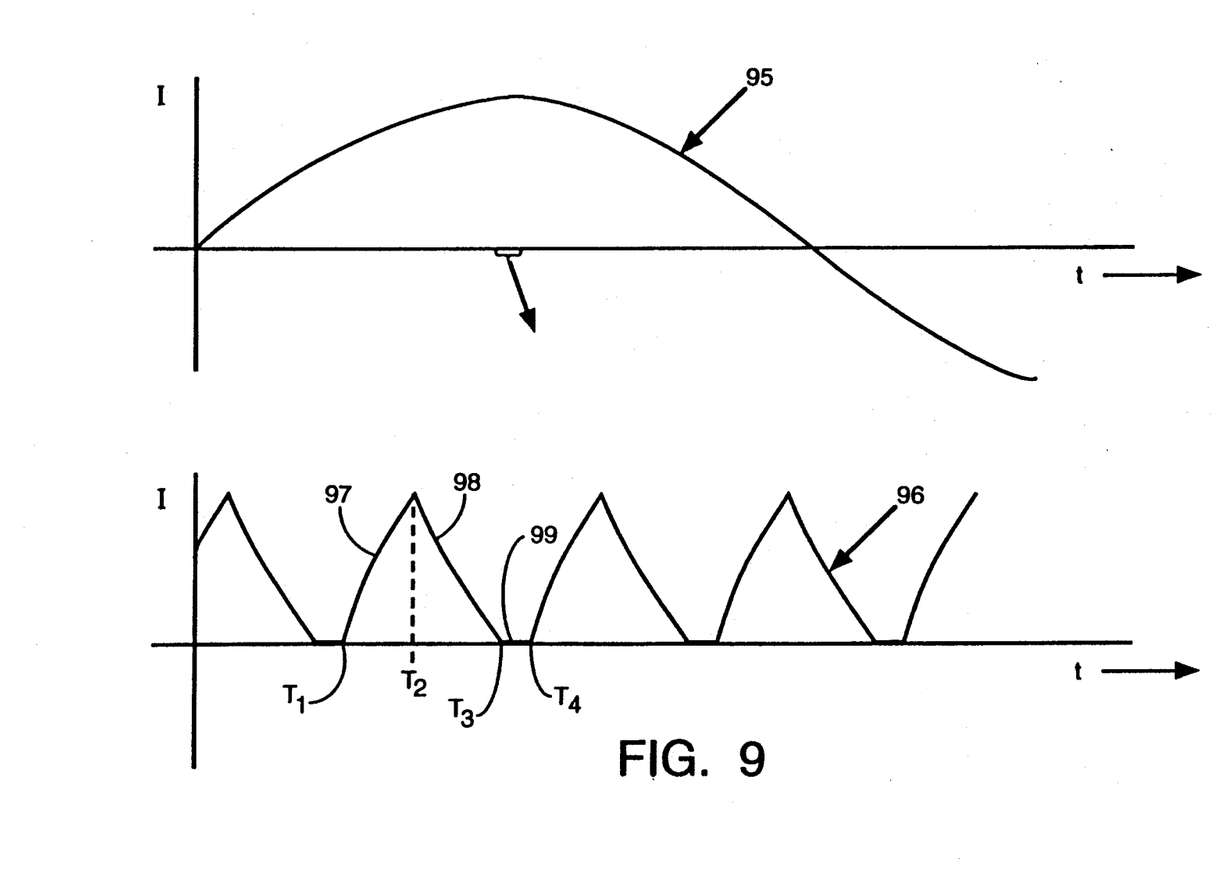
FIG. 9 are graphs showing the 60 Hz envelope of inverter current and the inverter current on an expanded time scale during constant frequency inverter charging operation.

Graphs illustrating the inverter current for constant frequency operation of the present invention are shown in FIG. 9. The graph 95 is the envelope of the inverter current waveform with the inverter switching at a higher frequency, e.g., 19,200 Hertz, and for clarity of illustration the individual inverter switching cycles are not shown. The envelope of the current traces out the 60 Hertz waveform 95. As noted above, the peak of the inverter current is proportional to the line voltage, which in this case is a 60 Hertz sine wave. With the inverter being switched at the constant 19,200 Hertz frequency, and with a fixed pulse width for the first state, the inverter-charger draws a non-distorted current proportional to and in phase with the input voltage waveform. In other words, the power transformer and inverter, acting as a charger for the battery, appears as a purely resistive load to the input power lines 31 and 32. Therefore, power factor correction is achieved without requiring additional control circuitry.

The graph 96 is inverter current at an expanded time scale so that individual inverter cycles are visible. As illustrated in this graph, at time $T_1$, the first or energy buildup state begins, resulting in the ramp-up of current shown by the line 97 at a rate determined by the inductance 80 and instantaneous line voltage 83. At time $T_2$, the second state begins, resulting in energy release and the ramp-down of current indicated by the line 98 in FIG. 9. The curved shape of these waveforms shows the effect of the transformer resistances 81. The inverter current reaches zero current at a time $T_3$, which will vary depending on the instantaneous line voltage across the inverter at that point in time. At a time $T_4$, which, in constant frequency operation, is a selected time difference from the time $T_1$, the first state is again initiated. The waveform 96 in FIG. 9 is taken from the peak of the cycle of the inverter current 95, illustrating that the time $T_3$ is, even at this point in the waveform, separated from the time $T_4$ by a wait state, the third state, indicated by the line 99 in FIG. 9. The on-time of the switches 62 and 64, the time difference between $T_2$ and $T_1$, is selected so that the time $T_3$ at which the current ramps to zero is less than the time $T_4$ even at the peak of the waveform 95. Where constant frequency operation is not required, the time $T_3$ at which the inverter current declines to zero is sensed and a new energy buildup state is immediately initiated, with the result that the inverter current waveform is a continuous sawtooth-type wave with substantially no time at which the inverter current dwells at zero.

Figure 10:
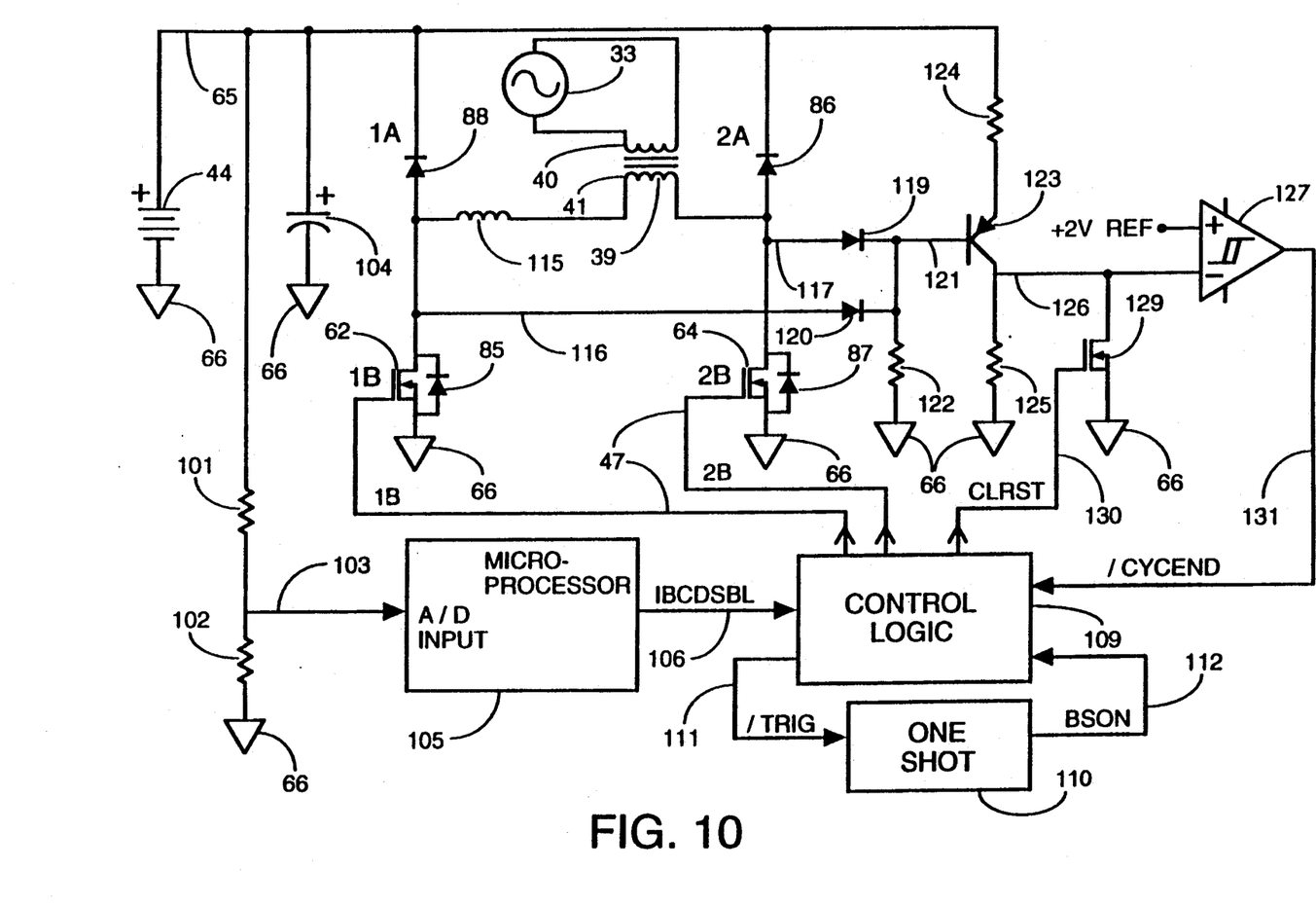
FIG. 10 is a circuit schematic illustrating a control arrangement in accordance with the present invention.

A more detailed view of an exemplary circuit for controlling the inverter for battery charging in accordance with the invention is shown in FIG. 10. Because the upper switching devices 61 and 63 in the bridge do not participate in the charging operation, they are not shown in FIG. 10, although they could be switched rather than the switches 62 and 64. In effect, in the charging mode, the inverter functions as a full bridge rectifier composed of the four diodes 85-88 connected to rectify the output voltage across the primary 41 of the transformer 39 and apply the rectified voltage between the line 65 and the (ground) line 66, with these diodes being normally backed biased by the voltage from the battery 44. Only the two lower switching devices 62 and 64 are needed to participate in the charging of the battery, although it is noted that the two switching devices 61 and 63 could alternatively be utilized as the pair which is used to selectively short the primary of the transformer. The preferred control of the switching of the switching devices (e.g., MOSFETs) 62 and 64 with reference to FIG. 10 is described below.

Figure 11:
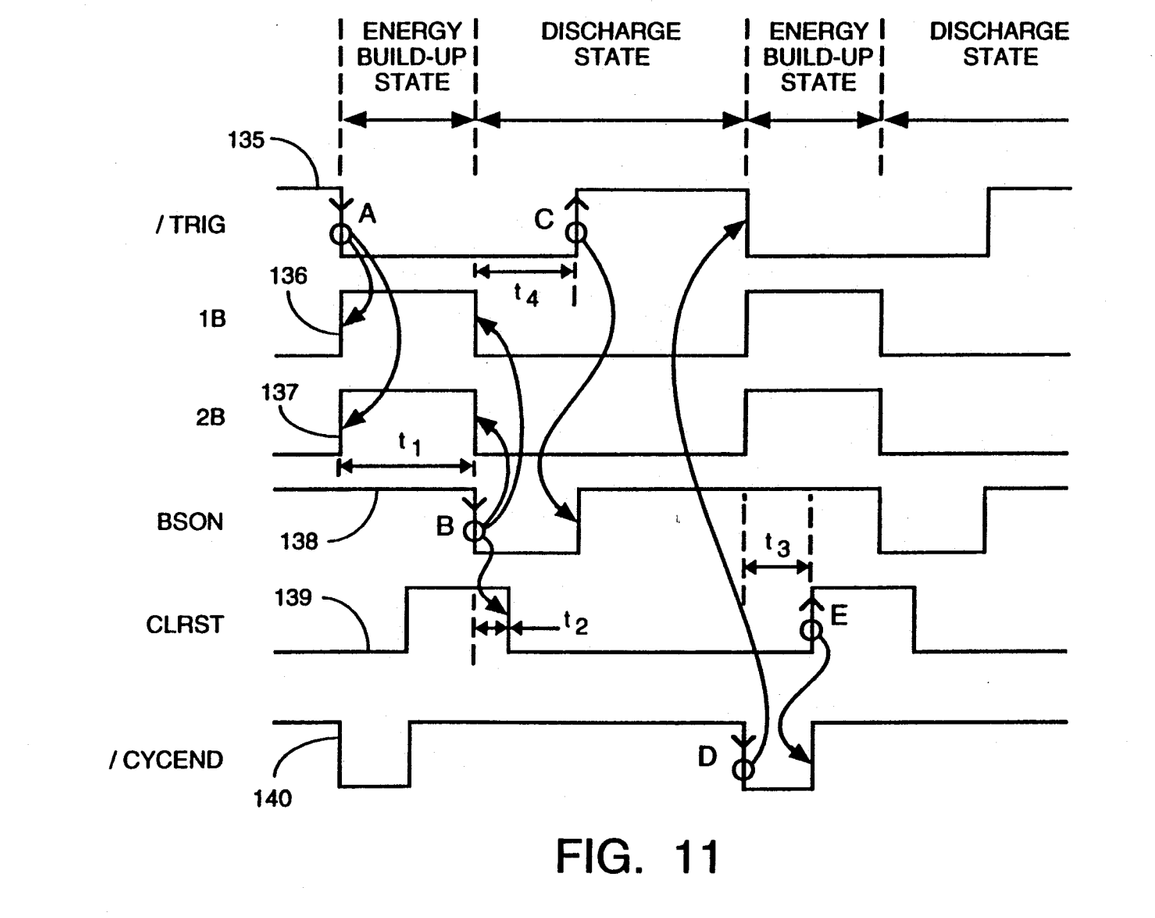
FIG. 11 are illustrative graphs showing the timing relationships of various control signals shown in FIG. 10.

The battery voltage on the line 65 is scaled down by a voltage divider formed of resistors 101 and 102 and provided on a line 103 to the analog to digital converting input of a microprocessor 105. The microprocessor 105, which can be of any various types of microprocessors well known in the art (e.g., a high integration single chip microcomputer such as the UPD78C14CW produced by NEC) determines if the battery needs charging based on the monitored battery voltage. If so, the microprocessor 105 turns on the inverter charging system by switching an output signal IBCDSBL on a line 106 low, which signals control logic 109 to start battery charging. The control logic 109, as described further below, is connected to a one shot 110 which provides a predetermined pulse width, and provides control signals on the lines 47 to the switches 62 and 64. With reference also to the control logic timing diagram of FIG. 11, the first energy build up state is initiated when the signal /TRIG on the line 111 goes low at point A in FIG. 11. In FIG. 11, the signal /TRIG is shown by the graph 135, the switching control signal 1B to the switching device 62 by the graph 136, the switching control signal 2B to the switching device 64 by the graph 137, the signal BSON on the line 112 by the graph 138, an output signal CLRST on a line 130 from the control logic by the graph 139, and a signal /CYCEND on a line 131 by the graph 140. When the signal /TRIG goes low at point A, both bottom switches 62 and 64 of the H-bridge inverter are turned on as the control signals 1B and 2B go high. The signals /TRIG going low also triggers the one shot 110 to put out the fixed output timing pulse BSON on the line 112. The duration of this pulse determines the magnitude of the battery charge current, with longer pulses yielding higher current. When the one shot times out after a time $t_1$, the signal BSON will go low at point B, causing the bottom inverter switches 62 and 64 to turn off. This marks the beginning of the discharge state where the energy that was stored in the leakage inductances of the transformer will cause a current to flow into one of the two body diodes of the upper inverter switches. Which diode the current flows in depends on the instantaneous polarity of the AC line voltage.

After a short time delay $t_4$ after BSON goes low, the signal /TRIG will go high at point C. This, in turn, causes the signal BSON to go high as the one-shot pulse generator 110 is reset.

To determine when inverter current reaches zero in the variable frequency mode, a conduction limit circuit monitors the voltage drop across the diodes 86 and 88 on lines 116 and 117 passed through diodes 120 and 119, respectively, to a line 121 which is connected to ground through a resistor 122. The line 121 is connected to the base of a transistor 123, the emitter of which is connected through a resistor 124 to the DC voltage on the line 65, and the collector of which is connected to ground through a resistor 125. The output voltage from the collector on a line 126 is provided to the inverting input of a comparator 127 which compares the signal to a reference (e.g., two volts) and provides the /CYCEND signal on the line 131. During a time delay $t_2$, the control logic puts out the CLRST signal on the line 130 to an FET 129 which is connected to the line 126 and disables the conduction limit circuit during the delay time $t_2$. At the time either of the diodes 86 or 88 turns on and conducts, one of the diodes 119 or 120 will become forward biased and thus impose a voltage across the resistor 122. The transistor 123 and the resistor 124 form a current source whose current is zero while the diodes 86 or 88 are forward biased. When the diodes 86 and 88 again become back biased (at the end of the discharge state) current will flow in the transistor 123 and cause a voltage across the resistor 125 which is large enough to trip the comparator 127, causing the signal /CYCEND to go low at point D shown in FIG. 11. When /CYCEND goes low at point D, /TRIG goes low, starting another energy build-up state such as indicated at the point A. After a short period of time $t_3$, CLRST will go high, causing /CYCEND to go high while the conduction limit circuit is disabled.

The control logic operates in the preferred variable frequency mode alternating between energy build-up and release (discharged) states until the microprocessor 105 senses that the battery voltage is sufficiently high that the battery is fully charged. The microprocessor then causes the signal IBCDSBL to go high, which signals the control logic to stop battery charging.

Figure 12:
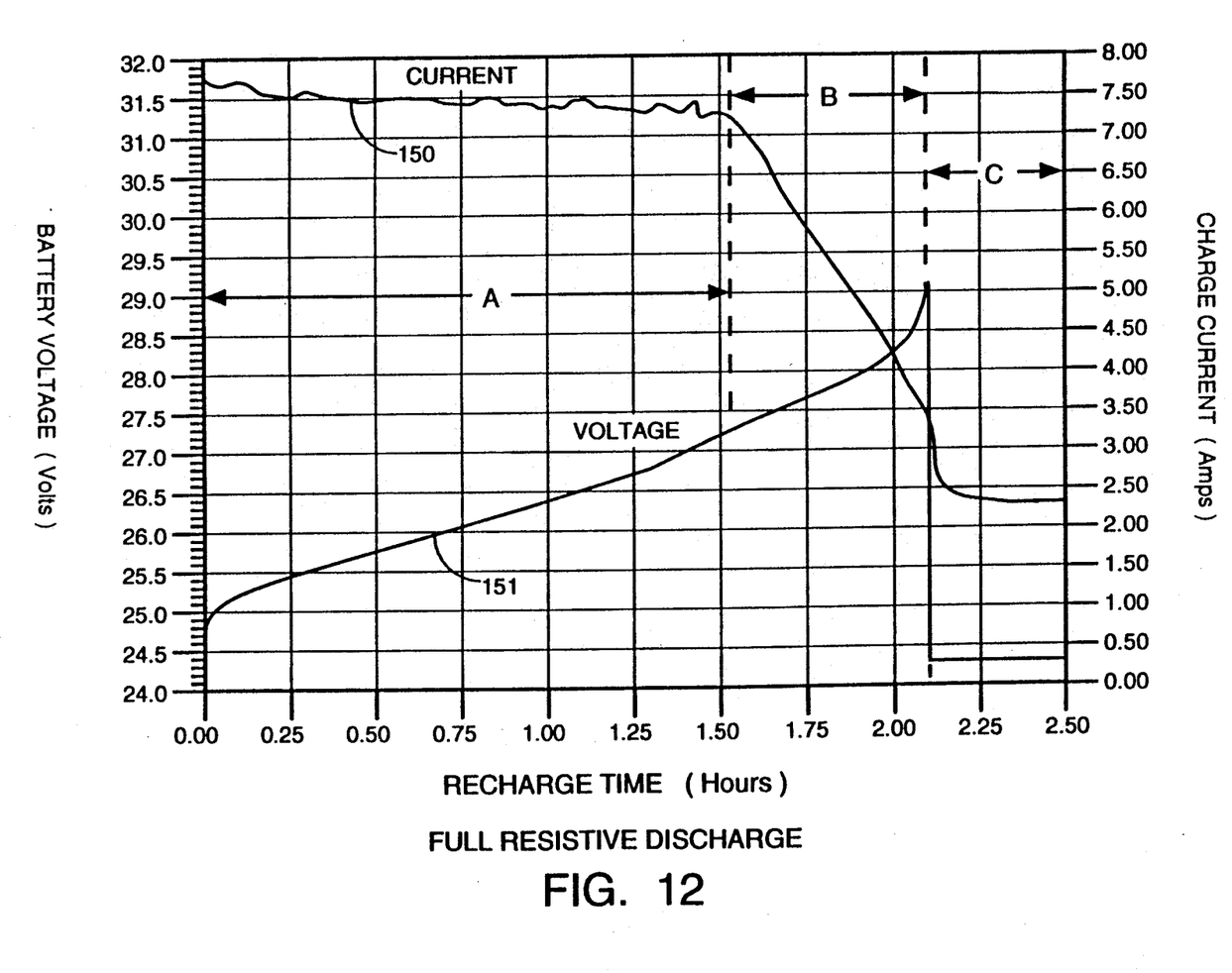
FIG. 12 are illustrative graphs of battery charging current and voltage during a recharge of a typical battery.

Typical battery voltage and current (RMS) during a charge of the battery using the inverter in accordance with the present invention is illustrated in FIG. 12. During the period of time marked "A" in FIG. 12, the inverter charger is operating in its normal constant current mode, illustrating recharge current by the line 150 and battery voltage by the line 151. The period of time marked "B" is a current taper mode where the on time of the one shot (the energy build up state time) is shortened. The on time is shortened so that the charge current is reduced as the battery voltage increases. Typically, batteries will show a faster rate of increase of the battery voltage near full charge than when charge is low. By tapering the current, it is possible to decrease the rate of rise of battery voltage, allowing easier monitoring of the charger turnoff voltage. The section labeled "C" occurs when the microprocessor has determined that battery voltage is sufficiently high and has turned off the inverter charger. During this time, the inverter charger is off and a small housekeeping power supply can furnish power to the control circuit so that the battery does not discharge. If desired, a small auxiliary battery charger having relatively low rated components can be utilized to provide a trickle charge.

Figure 13:
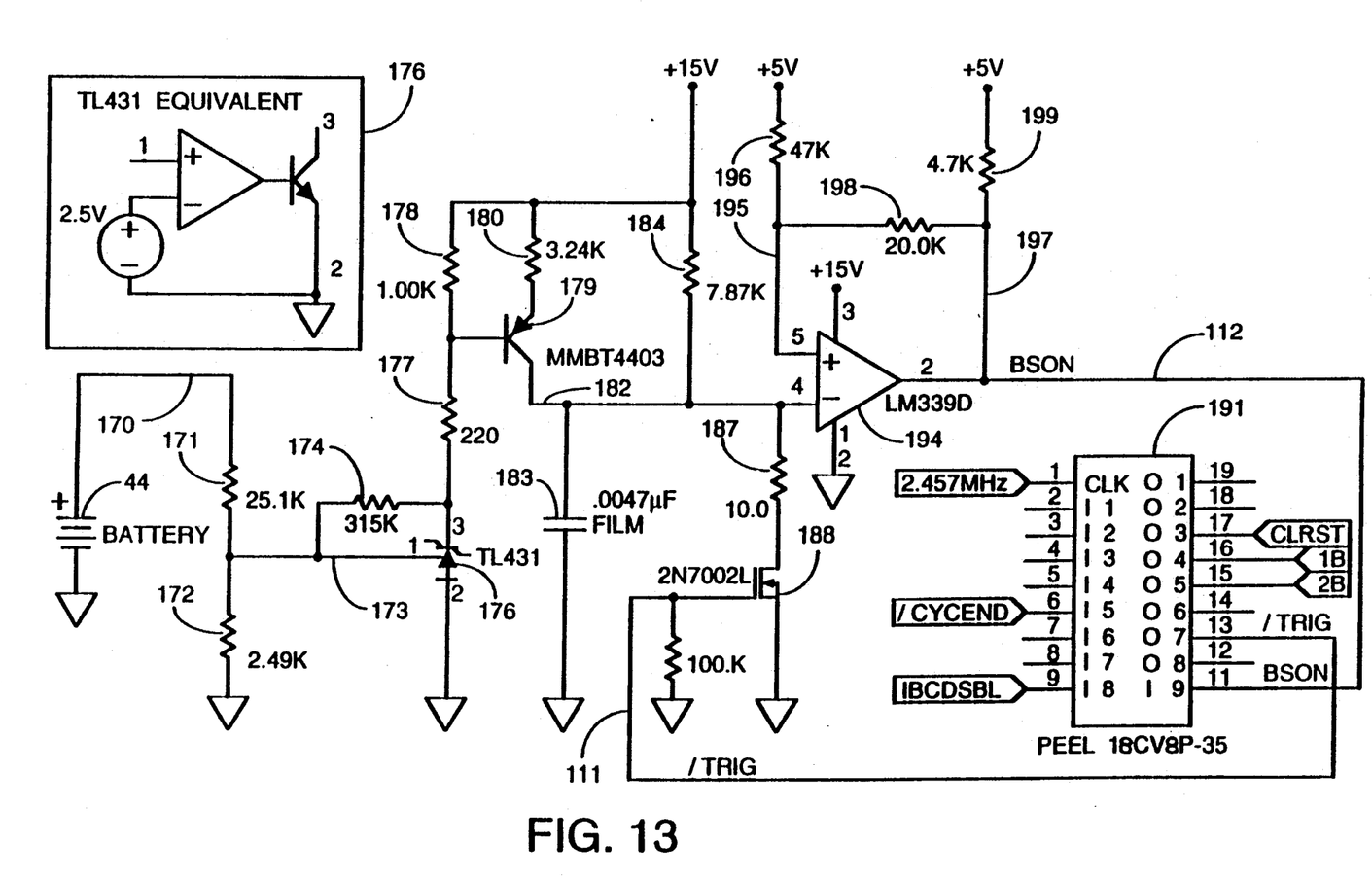
FIG. 13 is a circuit schematic illustrating the control logic and one shot blocks of FIG. 10 in more detail.

A more detailed schematic diagram of a preferred circuit comprising the one shot 110 and control logic 109 is shown in FIG. 13. The one shot generator includes a comparator 194 and an R-C time constant circuit formed by a capacitor 183 and a resistor 184. When the /TRIG signal goes low, an FET 188 which receives this signal at its gate turns off and allows the capacitor 183 to charge by current flowing through the resistor 184. When the voltage on the capacitor 183 as seen on the line 182 exceeds a selected voltage (e.g., +5 V) the output of the comparator 194, which is the signal BSON on the line 112, will go low. This signals the end of the fixed pulse width.

The resistor 199, connected by a line 197 to the line 112 carrying the signal BSON, is a pull up resistor needed because of the open collector output of the comparator 194. The resistors 196 and 198 provide positive feedback or "hysteresis", to avoid oscillations at the comparator switching point and thus provide a clean output signal BSON.

After some period of time, the control logic, represented by programmable logic device (PEEL) 191, will switch the signal /TRIG high, which turns the FET 188 on, causing the capacitor 183 to discharge to zero through the resistor 187. The one shot remains in this state until it is commanded to provide a new pulse as signaled by /TRIG again going low.

Because the one shot pulse width controls the average battery charging current, altering the rate of charge on the capacitor 183 provides a means to control the charging current. In the preferred embodiment of the invention, it is desirable to lower or taper the charge current as the battery nears full charge.

Sensing of the battery nearing full charge is obtained by monitoring the voltage from the battery 44 on the line 170 with an error amplifier 176 through a voltage divider composed of resistors 171 and 172. Line 173 connects the voltage divider to the error amplifier 176. An equivalent circuit for the error amplifier 176 is shown in the box labeled 176 in FIG. 13. When the battery voltage is low, the error amplifier 176 is normally off. When the battery voltage becomes sufficiently high, current will begin to flow through the resistor 177 into the error amplifier 176. As the battery voltage rises further, this current also rises. The battery voltage at which this current begins to flow is determined primarily by the resistors 171 and 172. Resistor 174 controls the rate of rise of the current as a function of battery voltage rate of rise. The current flowing into the error amplifier 176 causes a voltage drop on a resistor 178, and as the current increases, the transistor 179 will go from its cut-off state to its active state. When it does so, it causes a current to flow in a resistor 180 that is directly proportional to the current flowing into the error amplifier 176. The current flowing in the resistor 180 and the transistor 179 is fed to the timing capacitor 183. This current adds to the current flowing in the resistor 184 and has the effect of charging the capacitor 183 more quickly (when /TRIG is low). This quicker charging of the capacitor 183 results in shorter pulse widths, which consequently result in lower averge battery charge current. The programmable logic (PEEL) circuit 191 is programmed to provide the desired signals BSON and /TRIG and can perform a variety of other functions.

It is seen that if the inverter switching devices, the intrinsic diodes, or the control of the inverter fails in any significant way during the time that battery charging is being carried out in accordance with the invention, this fact can be determined by monitoring the inverter current or charge operation. Battery failure can also be monitored during battery charging.

It may be noted that the present invention may be applied to other inverter topologies than the bridge configurations and to other types of switching devices than those shown for exemplary purposes.

It is understood that the invention is not confined to the particular embodiments set forth herein as illustrative, but embraces such modified forms thereof as come within the scope of the following claims.

What is claimed is:

1. A backup power system having battery charging capability comprising:
   (a) input lines for receiving AC power input and output lines for providing AC power output to a load;
   (b) a power transformer having its secondary connected across the output lines and a primary coupled to the secondary;
   (c) a battery providing a DC output voltage;
   (d) an inverter having an output connected to the primary of the power transformer and switching devices connected in a bridge configuration which are controllable to convert DC voltage power from the battery connected to an input of the inverter to AC voltage power at the primary of the power transformer, the switching devices being responsive to control signals to switch between one and off states;
   (e) control means, connected to the switching devices in the inverter to control the same, for controlling the inverter during normal supply of AC power on the input lines to the output lines to provide a charging cycle to the battery, the charging cycle including a first energy build-up state in which switching devices in the inverter bridge conduct to provide a conduction path which shorts the primary of the transformer for a selected period of time to build up a current through the effective leakage inductances of the primary and secondary of the transformer, and a second energy discharge state in which a conduction path is provided from the primary through the switching devices of the bridge to the battery and back to the primary of the transformer, the total period of the charging cycle being short in comparison to the period of the AC input power waveform, wherein the current induced by the inductances of the transformer flows into the battery during the second state to discharge the energy stored in the inductances.

2. The system of claim 1 wherein the control means controls the switching devices of the inverter to repeat the first and second states continuously to charge up the battery.

3. The system of claim 1 wherein the control means controls the switching of the switching devices in the inverter so that the first state begins at regularly spaced periodic points in time and the second state terminates when the energy stored in the transformer inductances is completely discharged and the current flowing to the battery reaches zero, and wherein the current in the inverter remains at zero until the initiation of the next first state.

4. The system of claim 1 wherein the switching devices of the inverter are gate controlled switching devices which allow current flow therethrough with anti-parallel diodes connected thereto, wherein there are four switching devices connected in an H-bridge configuration, and wherein the battery voltage is selected to be greater than the peak AC voltage applied across the output of the inverter by the primary of the transformer so that the antiparallel diodes of the switching devices are back-biased except when current is flowing from the transformer inductances to discharge the energy stored in the inductances.

5. The system of claim 4 wherein the gate controlled switching devices are power MOSFETs and the anti-parallel diodes are intrinsic anti-parallel diodes.

6. The system of claim 1 further including a static switch connected between the input and output lines which is responsive to a control signal to disconnect or reconnect power from the input lines to the output lines.

7. A backup power system having battery charging capability comprising:
(a) input lines for receiving AC power input and output lines for providing AC power output to a load;
(b) a power transformer having a secondary connected across the output lines and a primary coupled to the secondary;
(c) a battery providing a DC output voltage;
(d) an inverter having an output connected to the primary of the power transformer and having four gate controlled switching devices which allow current flow therethrough with anti-parallel diodes connected thereto which are connected in an H-bridge configuration, the switching devices controllable to convert DC voltage power from the battery connected to an input of the inverter to AC voltage power at the primary of the power transformer, the switching devices being responsive to control signals to switch between on and off states, wherein the battery voltage is selected to be greater than the peak AC voltage applied across the output of the inverter by the primary of the transformer so that the antiparallel diodes of the switching devices are normally back-biased by the voltage from the battery;
(e) control means, connected to the switching devices in the inverter to control the same, for controlling the inverter during normal supply of AC power on the input lines to the output lines to provide a charging cycle to the battery, the charging cycle including a first energy build-up state in which during the positive half cycle and the negative half cycle of the voltage waveform across the primary, at least one of the switching devices in the inverter bridge is turned on for a selected period of time to provide a conduction path which shorts the primary of the transformer through the switching device and through one of the anti-parallel diodes to build up a current through the effective leakage inductances of the primary and secondary of the transformer, and a second energy discharge state in which the switching device is turned off and a conduction path is provided from the primary through two of the anti-parallel diodes to the battery and back to the primary of the transformer, the total period of the charging cycle being short in comparison to the period of the AC input power waveform, wherein the current induced in the inductances of the transformer flows into the battery during the second state to discharge the energy stored in the inductances.

8. The system of claim 7 wherein the control means controls the switching devices of the inverter bridge to repeat the first and second state continuously to charge up the battery.

9. The system of claim 7 wherein the control means controls the switching of the switching devices in the inverter so that the first state begins at regularly spaced periodic points in time and the second state terminates when the energy stored in the transformer inductances is completely discharged and the current flowing to the battery reaches zero, and wherein the current in the inverter remains at zero until the initiation of the next first state.

10. The system of claim 7 wherein the gate control switching devices are power MOSFETs and the anti-parallel diodes are intrinsic anti-parallel diodes.

11. The system of claim 7 further including a static switch connected between the input and output lines which is responsive to a control signal to disconnect or reconnect power from the input lines to the output lines.

12. The system of claim 7 wherein during the first state the controls means turns on two of the switching devices to short out the primary of the transformer and turns off both switching devices during the second state.

13. A method of charging the battery in a power system of the type having power lines for receiving AC input power having a waveform with positive and negative half cycles, a power transformer having its secondary connected across the power lines and a primary coupled to the secondary, a battery providing a DC output voltage, and an inverter connected to the battery and having an output connected to the primary of the power transformer and switching devices connected in a bridge configuration with anti-parallel diodes associated with each of the switching devices which are normally back-biased off by the battery voltage, comprising the steps of:

(a) turning on at least one of the switching devices in the bridge to provide a current path from the primary of the transformer through the switching device and through one of the anti-parallel diodes back to the primary to effectively short the primary during a positive or negative half cycle of the input power waveform for a selected period of time which is short compared to the period of the power waveform to build up a current through the effective leakage inductances of the primary and secondary of the transformer;

(b) then, turning off the switching device and allowing current induced by the inductances of the transformer to flow through one of the anti-parallel diodes into the battery and through another of the anti-parallel diodes back to the primary to discharge the energy stored in the transformer inductances.

14. The method of claim 13 including the further step of leaving off all switching devices in the bridge after the current into the battery from the inductances has dropped to zero, and then again turning on the switching device to provide a conduction path which shorts the primary of the transformer at a selected time after the switching device had previously been turned on, and repeating the steps to charge the battery.

15. The method of claim 13 wherein the switching device which has been switched off is left off until the current in the inductances reaches zero, and thereafter turning on the switching device to again provide a conduction path which shorts the primary of the transformer and repeating the cycles to charge the battery.

16. The method of claim 13 wherein the switching devices in the inverter are power MOSFETs having intrinsic anti-parallel diodes and wherein the step of turning the switching device on and off comprises applying a signal to the gate of the selected MOSFET to provide a conduction path which shorts out the primary of the transformer and the step of turning off the switching device comprises removing the gate signal from the MOSFET to turn it off to allow current to flow through the intrinsic anti-parallel diodes of the MOSFETs into the battery.

17. The method of claim 13 wherein in step (a) two switching devices are turned on to short the primary and in step (b) the two switching devices are turned off.

18. A battery charger for a battery, which is adapted to receive AC input power, having alternating positive and negative peak voltages, across power lines, comprising:

(a) a power transformer having a secondary connected across the power lines and a primary coupled to the secondary;

(b) four diodes connected in a bridge configuration having an output connected to the primary of the power transformer and having an input connected to the battery, wherein the battery voltage is selected to be greater than the peak AC voltage applied across the output of the bridge by the primary of the transformer when the AC input power is applied from the power lines to the secondary of the transformer so that the diodes are normally back-biased by the voltage from the battery, and switching devices connected across at least two of the diodes in the bridge so that when the switching devices are turned on the primary is shorted by the switching devices, the switching devices being responsive to control signals to switch between on and off states;

(c) control means, connected to the switching devices to control the same, for controlling the switching devices during normal supply of AC power on the power lines to provide a charging cycle to the battery, the charging cycle including a first energy build-up state in which the switching devices are turned on for a selected period of time to provide a conduction path which shorts the primary of the transformer to build up a current through the effective leakage inductances of the primary and secondary of the transformer, and a second energy discharge state in which the switching devices are turned off and a conduction path is provided from the primary through two of the diodes to the battery and back to the primary of the transformer, the total period of the charging cycle being short in comparison to the period of the AC input power waveform, wherein the current induced in the inductances of the transformer flows into the battery during the second state to discharge the energy stored in the inductances.

19. The battery charger of claim 18 wherein the control means controls the switching devices to repeat the first and second states continuously to charge up the battery.

20. The battery charger of claim 18 wherein the control means controls the switching of the switching devices so that the first state begins at regularly spaced periodic points in time and the second state terminates when the energy stored in the transformer inductances is completely discharged and the current flowing to the battery reaches zero, and wherein the current remains at zero until the initiation of the next first state.

21. The battery charger of claim 18 wherein the switching devices are power MOSFETs and the diodes across which the switching devices are connected are intrinsic anti-parallel diodes in the MOSFETs.

22. The battery charger of claim 18 wherein the control means monitors battery voltage during charging, and when the battery voltage reaches a selected level the control means controls the switching devices so that the selected period of time of the first state when the switching devices are turned on thereafter is decreased as battery voltage increases.

* * * * *

UNITED STATES PATENT AND TRADEMARK OFFICE
CERTIFICATE OF CORRECTION

PATENT NO.    :    5,302,858
DATED         :    April 12, 1994
INVENTOR(S)   :    Douglas C. Folts It is certified that error appears in the above-indentified patent and that said Letters Patent is hereby corrected as shown below:

In column 10, line 65 of the patent, "one" should be --on-- as per Amendment dated July 7, 1993.

Signed and Sealed this

Twenty-first Day of March, 1995

Attest:

BRUCE LEHMAN

Attesting Officer      Commissioner of Patents and Trademarks